April 21, 1953  G. NEUMANN  2,636,058
GASTIGHT STORAGE BATTERY AND METHOD OF MANUFACTURING SAME
Filed Nov. 18, 1950  2 SHEETS—SHEET 1

INVENTOR
Georg NEUMANN
BY
AGENT

April 21, 1953        G. NEUMANN        2,636,058
GASTIGHT STORAGE BATTERY AND METHOD OF MANUFACTURING SAME
Filed Nov. 18, 1950        2 SHEETS—SHEET 2

*INVENTOR*
Georg NEUMANN
BY *Fritz C. Hirschwald*

A'GENT.

Patented Apr. 21, 1953

2,636,058

UNITED STATES PATENT OFFICE 2,636,058

GASTIGHT STORAGE BATTERY AND METHOD OF MANUFACTURING SAME

Georg Neumann, Paris, France, assignor to "Bureau Technique Gautrat," S. A. R. L., Les Lilas, France, a society of France Application November 18, 1950, Serial No. 196,376
In France November 22, 1949

10 Claims. (Cl. 136—7)

The present invention relates to storage batteries which are gastight even under pressure, and in particular to alkaline storage batteries made according to the U. S. patent application of Georg Neumann and Uscha Gottesmann, Ser. No. 73,608, filed January 29, 1949, now Patent Number 2,571,927, October 19, 1951, for "Electrolytic Cells, and in Particular Alkaline Cells," of which this application is a continuation-in-part, and to methods of manufacturing such batteries.

It is known to include, in the positive electrode of a gastight alkaline storage battery, nickel oxides which constitute the positive active material. With these nickel oxides is incorporated at least one body ensuring conductivity, for instance graphite.

It is also known to include, in the negative electrode of such a storage battery, cadmium or iron or a mixture or alloy of these metals, which may be in the form of oxides or hydrates.

It should be noted that both the positive and the negative electrodes may be constituted by a plurality of plates.

In these gastight storage batteries, dangerous internal pressures are avoided by causing the gases evolved during charging or at the end of this operation to recombine with the active material of the electrodes (see the above mentioned prior application).

When, in a battery including a plurality of storage cells connected in series, discharge is allowed to go on until one of the cells, of an amp.-hr. capacity slightly lower than that of the other cells, becomes inverted (slight differences in amp.-hr. capacity are unavoidable even if the rated capacities of the respective cells are equal) and current is still caused to flow in the same direction, there are produced on the negative electrode of this cell oxides which are difficult to reduce and which impair the subsequent qualities of the storage battery.

In addition to this detrimental consequence of what will be hereinafter called an "overdischarge," there is, in the case of a gastight storage battery, another drawback due to the fact that, in such a storage battery, means are provided for enabling the gases evolved in the cell to recombine but that these means were provided, up to now, concerning the gases evolved near the end of charging and do not apply to the gases evolved during overdischarge. It follows that an overdischarge might be particularly detrimental in the case of a gastight storage battery due to the increase of internal pressure therein.

According to my invention, the risks resulting from overdischarge in the case of slight unequalities in the amp.-hr. capacities of gastight cells connected in series are obviated by giving the negative electrode of each cell a capacity higher than that of its positive electrode and by closing the gastight vessel of each of these cells, when they are being manufactured, only when the two electrodes thereof have been brought to such a state of oxidizing or charging that the negative electrode is charged to a higher degree than the positive electrode, the difference of charge between the two electrodes being however at most equal to the difference between their capacities.

In other words, according to my invention, when the positive electrode of a gastight storage cell is fully oxidized, and therefore fully charged, the amount of oxidizable metal then present on the negative electrode corresponds, for this electrode, to a possibility of discharge higher than that of the positive electrode.

Preferred embodiments of my invention will be hereinafter described with reference to the accompanying drawings, given merely by way of example, and in which.

Figure 1:
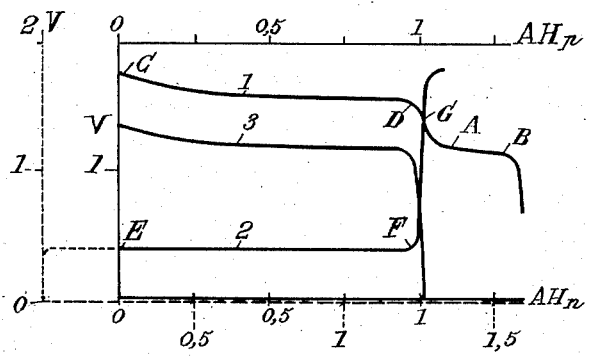
Figs. 1 to 4 show the discharge curves of gastight storage cells, the voltages indicated by the curves of Figs. 1 to 3 being measured with reference to a zinc electrode immersed in the solution of the same discharge cell.

Fig. 1 shows the discharge curves of an alkaline storage battery of a known type, the positive electrode of this accumulator including graphite mixed with nickel oxide. The discharge curve 1 of such a cell practically stops near point D. However discharge further takes place along portion AB of the curve, probably owing to the presence of oxygen included in the above mentioned graphite.

The discharge curve of a negative iron-cadmium electrode is shown by curve 2 when this electrode is given a useful capacity substantially equal to the useful capacity of the positive electrode. In this case, the potential of this negative electrode remains at the same value along portion EF of the curve. Then it rises suddenly. At point G, where curves 1 and 2 cross each other, the polarity of the storage battery is reversed. Curve 3 shows the difference of potential (difference between the ordinates of curves 1 and 2) between the terminals of the storage battery, which drops to zero for the abscissa of point G, to become negative for higher abscissas.

Figure 2:
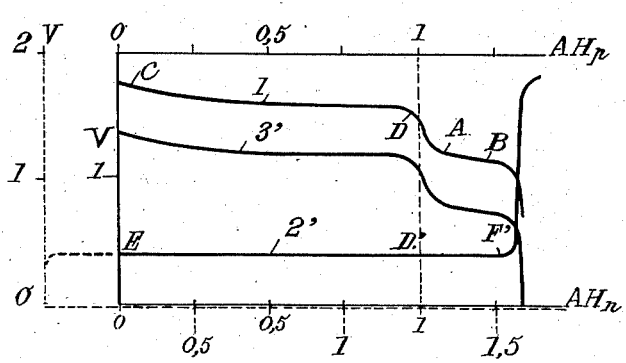
Figure 3:
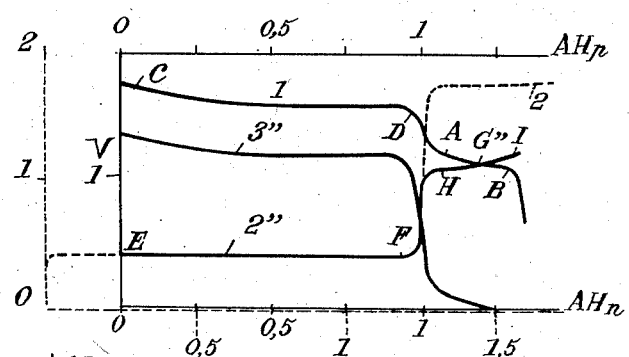

The curves of Figs. 2 and 3 relate to storage cells made according to my invention.

In the case of Fig. 1, the negative electrode is made only of the usual metals. Owing to my invention, useful discharge of the negative electrode is prolonged as far as a point F' (curve 2' of Fig. 2) the abscissa of which is greater than that of point F of Fig. 1. Thus, while the storage cell is practically discharged for the abscissa of points D and D', the negative electrode can still be oxidized between points D' and F' under the effect of the current delivered by other cells in series with that considered. Consequently, the risks of injury caused by overdischarge of this gastight cell are considerably reduced.

However, it must be well understood that this is not due only to the fact that the capacity of the negative electrode is higher than that of the positive electrode, but also to the fact that, when the gastight vessel of the cell was closed, during the manufacture thereof, the useful charge of the negative electrode had been brought to a higher point than the useful charge of the positive electrode, these two electrodes being then capable, due to the characteristics of sealed discharged cells, of receiving only substantially equal charges which could hardly make it possible to overcharge one of them after the other is fully charged, whereas this can easily take place in the case of an open cell.

Figure 4:
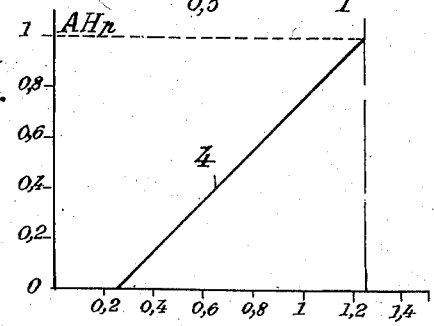

I will now give a numerical example, based upon the curve of Fig. 4, to illustrate this feature.

If it is supposed that the useful capacity of the positive electrode is 1 amp.-hr., the negative electrode will be given, according to common practice, a capacity higher than 1 amp.-hr. And the vessel of the gastight cell will be sealed when the charge received by the negative electrode and capable of being delivered by it is higher than the charge received by the positive electrode and capable of being delivered by it. The difference between these charges may depend upon various circumstances but it should always be chosen higher than the tolerances of capacity of the positive electrodes when they are manufactured. Thus, if a difference of 0.25 amp.-hr. is to exist between the charges of the two electrodes, the capacity of the negative electrode is to be at least equal to 1.25 amp.-hr. and the following conditions are to be complied with:

If the vessel of the tank is sealed when the nickel of the positive electrode can deliver no charge, the negative electrode must have been previously charged so as to be able to deliver 0.25 amp.-hr.;

If the vessel is sealed when the nickel of the positive electrode is capable of delivering the charge corresponding to its maximum capacity of 1 amp.-hr., the negative electrode must have been previously charged so as to be able to deliver 1.25 amp.-hr.;

In a general way, if the positive electrode has been charged so as to be able to deliver a value ranging from 0 to 1 amp.-hr. marked in ordinates on the curve of Fig. 4, then, at the time of closing of the vessel, the negative electrode must have been charged to a value corresponding to the abscissa of the corresponding point of this curve.

However, it is advantageous, in the case that is being considered, to give the negative electrode a capacity still higher than 1.25 amp.-hr., for instance a capacity of 1.5 amp.-hr., while leaving the difference between the charges of the two electrodes equal to 0.25. Thus, the negative electrode will never be so charged as to be able to deliver more than 1.25 amp.-hr. and there will remain on this electrode, after full charging of the cell, an uncharged portion corresponding to 0.25 amp.-hr. This uncharged portion will play, near the end of the charging of the cell, the useful part indicated in the above mentioned prior patent application, which consists in delaying, in the course of the charging operation, the time when hydrogen starts being evolved at the negative electrode.

In Figs. 1 to 3, this last case is illustrated by the dotted lines ordinates and abscissas.

If, now, in order to prolong the possibilities of discharge of the negative electrode, I make use not of one of the metals of the active matter of the negative electrode but of another body, preferably a metallic one, this body is chosen in such manner that its potential in the electrolyte that is used (for instance an alkaline electrolyte) is lower than the potential of the active matter in this electrolyte but that, preferably, its overvoltage with respect to hydrogen in alkaline solution is at least equal to, or preferably higher than, the overvoltage of the main metal or metals of the electrode.

Among the auxiliary metals which can thus be used, it seems particularly advisable, in the case of an alkaline storage cell, to make use of copper, for instance in the powdery form or in amalgam with mercury, or merely fixed on the metallic envelope of the bags containing the electrode, or again in the form of separate plates.

Owing to the use of an auxiliary metal complying with these conditions, after discharge of the main metal or metals of the negative electrode of a weak cell of the battery, the potential of this electrode will rise so that the curve 2'' thereof (Fig. 3) will include a portion HI at a level higher than that of EF. Consequently, the voltage across the terminals of the cell will be considerably reduced for a substantial time after the useful portion of the discharge but before the polarity of this cell gets reversed. Thus the drop of voltage will be more easily perceived to warn that one or more of the elements of a battery have already passed the end of their useful discharge. Furthermore, and this is still more important, any amounts of oxygen as might tend to appear on the negative electrode will combine with said auxiliary metal and oxidize it. The risks above pointed out will thus be considerably reduced.

Furthermore, the fact that the overvoltage of the auxiliary metal with respect to hydrogen is higher than that of the main metal or metals, will facilitate, when the cell is subsequently recharged, the charging of the main metal or metals at the cost of said auxiliary metal, that is to say without loss of efficiency of the cell.

Of course the curves above referred to are given merely by way of example.

Figure 5:
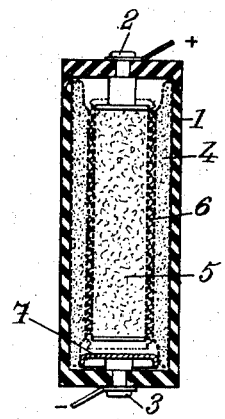
Figs. 5 and 6 are respectively a longitudinal section and a cross section of a storage cell made according to my invention.
Figure 6:
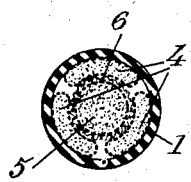

Figs. 5 and 6 show a storage cell made according to my invention.

The fluidtight sealed vessel is shown at 1. Inside this vessel and in the central part is the positive electrode 5, made of nickel oxide and graphite placed in a perforated cylinder of nickel plated steel. This electrode is in contact with the positive terminal 2.

The negative electrode 4 is located in the space adjoining the inner wall of vessel 1. It is constituted by powdery cadmium and/or iron placed in perforated bags of iron and steel, as visible on Fig. 6. A small plate 7 of a conductor material connects this negative electrode 4 with the negative terminal 3.

In the annular space between electrodes 4 and 5 there is a nylon strip 6 impregnated with the electrolyte and wound three or four times about electrode 5.

As above stated, according to my invention, if the metals constituting the electrodes are, for instance, nickel for the positive electrode and cadmium for the negative electrode, the amounts of these metals, i. e. their capacities, and their states of oxidation must comply with the following conditions when vessel 1 is sealed:

I. The ratio of the capacity of the positive electrode to the capacity of the negative electrode is:

$$\frac{1}{1+a+b}$$

II. If the positive electrode is fully charged, i. e. wholly in the form of oxide, a proportion $$\frac{1+a}{1+a+b}$$

of the negative electrode is in the metallic state and a proportion $$\frac{b}{1+a+b}$$

in the state of oxide, $a$ representing the amount of metal of the negative electrode which is to give the excess of charge thereof over the positive electrode and $b$ the amount of this metal which remains always uncharged, i. e. in the state of oxide.

The first condition is easy to comply with by suitably choosing the amounts of metal used for the two electrodes respectively. The second one can be complied with by, on the one hand, fully charging the positive electrode and, on the other hand fully charging the negative electrode and then discharging it in the proportion $$\frac{b}{1+a+b}$$

As above stated, $a$ and $b$ are advantageously chosen equal both to 0.25.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. In the method of making a gastight storage battery cell the steps of placing in a container an electrolyte, a positive electrode and a negative electrode having a higher capacity than the positive electrode, the condition of said negative electrode corresponding, prior to sealing, to a higher charged state than the condition of the positive electrode, the difference between the charged states of said two electrodes being at most equal to the difference between their capacities, and hermetically closing the container.

2. A gastight storage cell which comprises a sealed vessel, a positive electrode in said vessel, a negative electrode in said vessel in a state of charge higher than that of said positive electrode and having a higher capacity than said positive electrode, and an electrolyte in contact with both of said electrodes.

3. A gastight storage cell according to claim 2 in which the positive electrode includes in addition to the main active mass an auxiliary ingredient ensuring conductivity and the negative electrode includes at least one main metal and an auxiliary metal the potential of which in said electrolyte is lower than the potential of said main metal in said electrolyte and the overvoltage of which with respect to hydrogen is at least equal to the overvoltage of said main metal, the amount of the main metal of the negative electrode being so adjusted that its complete discharge takes place at about the same time as the complete discharge of the main active mass of the positive electrode, whereby the further discharge of the negative electrode is due to the oxidation of the auxiliary metal and the further discharge of the positive electrode is due to the oxygen taken up by said auxiliary ingredient.

4. A gastight storage cell according to claim 3 in which said auxiliary metal is copper.

5. A gastight storage cell according to claim 2 in which the difference of charge between between the electrodes is smaller than the difference between their capacities.

6. A gastight storage cell of the character described comprising a sealed vessel capable of confining under pressure the gases generated therein, and in said vessel a positive electrode and a negative electrode, said negative electrode having a higher capacity than said positive electrode and the oxidation states of said two electrodes being so adjusted that the capacity of the negative electrode to accumulate electric energy under the influence of a charging current is higher than that of the positive electrode.

7. A gastight storage cell of the character described comprising a sealed vessel capable of confining under pressure the gases generated therein, and in said vessel a positive electrode, and a negative electrode, the ratio of the capacity of the positive electrode to the capacity of the negative electrode on sealing the vessel being $$\frac{1}{1+a+b}$$

thereby ensuring that when the positive electrode is fully charged a proportion of $$\frac{1+a}{1+a+b}$$

of the negative electrode is in the metallic state and a proportion $$\frac{b}{1+a+b}$$

in the state of oxide, $a$ representing an amount of metal in the negative electrode giving an excess of charge over the positive electrode and $b$ representing an amount of metal remaining always uncharged, i. e. in the state of oxide, $a$ and $b$ being each approximately .25.

8. A gastight storage cell as defined in claim 2 wherein the auxiliary ingredient of the active mass of the positive electrode is graphite.

9. A gastight storage battery cell which comprises a sealed vessel capable of confining under pressure the gases generated therein, and in said vessel an alkaline electrolyte, a positive electrode containing in the active mass nickel oxide which is oxidized to a higher oxidation degree on charging, and a negative electrode containing the oxide of a metal selected from the group consisting of iron and cadmium, which oxide is reduced to the metal on charging, said negative electrode having a higher capacity than the positive electrode and the amount of metal on the negative electrode exceeding at any time substantially the electrically equivalent proportion of higher oxidized nickel oxide simultaneously present in the active mass of the positive electrode.

10. In the method of making a gastight alkaline storage battery cell, the steps of placing in a container an alkaline electrolyte, a positive electrode containing in the active mass nickel oxide, which is oxidized to a higher oxidation degree on charging, and a negative electrode containing the oxide of a metal selected from the group consisting of iron and cadmium, which oxide is reduced to the metal on charging, said negative electrode having a higher capacity than the positive electrode; providing, prior to the sealing of the container, a proportion of metal on the negative electrode exceeding substantially the electrically equivalent proportion of higher oxidized nickel oxide simultaneously present in the active mass of the positive electrode, thereby obtaining the negative electrode in a higher charged state than the positive electrode, the difference between the charges being made at most equal to the difference between the capacities; and hermetically closing the container while the negative electrode is thus higher charged than the positive electrode.

GEORG NEUMANN.

References Cited in the file of this patent

UNITED STATES PATENTS

| Number | Name | Date |
|---|---|---|
| 721,682 | Edison | Mar. 3, 1903 |
| 2,213,128 | Langguth | Aug. 27, 1940 |
| 2,269,040 | Rublee | Jan. 6, 1942 |

FOREIGN PATENTS

| Number | Country | Date |
|---|---|---|
| 317,130 | Great Britain | Aug. 12, 1929 |